US010393046B2

(12) United States Patent
Hayashima (10) Patent No.: US 10,393,046 B2
(45) Date of Patent: Aug. 27, 2019

(54) CONTROL APPARATUS FOR VEHICLE (71) Applicant: TOYOTA JIDOSHA KABUSHIKI KAISHA, Toyota-shi, Aichi-ken (JP)

(72) Inventor: Naoki Hayashima, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 37 days.

(21) Appl. No.: 15/869,279

(22) Filed: Jan. 12, 2018

(65) Prior Publication Data
US 2018/0216555 A1    Aug. 2, 2018

(30) Foreign Application Priority Data

Jan. 27, 2017 (JP) .................. 2017-013579

(51) Int. Cl.
F02P 5/15       (2006.01)
F02N 11/08      (2006.01)
F02D 41/06      (2006.01)
F02D 41/30      (2006.01)
F02N 11/00      (2006.01)
(Continued)

(52) U.S. Cl.
CPC ....... *F02D 41/062* (2013.01); *F02D 41/3076* (2013.01); *F02N 11/0848* (2013.01); *F02N 11/0862* (2013.01); *F02P 5/1506* (2013.01); *F02N 11/006* (2013.01); *F02N 11/04* (2013.01); *F02N 15/08* (2013.01); *F02N 2200/022* (2013.01); *F02N 2300/2002* (2013.01); *Y02T 10/48* (2013.01); *Y02T 10/6226* (2013.01); *Y02T 10/6286* (2013.01); *Y02T 10/7077* (2013.01)

(58) Field of Classification Search
CPC ............. F02N 11/0848; F02N 11/0862; F02N 2200/022; F02N 2300/2002; F02P 5/1506
USPC ...................... 123/179.3, 179.5, 406.54, 491
See application file for complete search history.

(56) References Cited

U.S. PATENT DOCUMENTS 6,098,585 A     8/2000  Brehob et al.
7,751,965 B2*   7/2010  Ando ................... F02P 5/1506
                                                          701/113
(Continued)

FOREIGN PATENT DOCUMENTS

JP      11-125136       5/1999
JP      2005-273490     10/2005
(Continued)

*Primary Examiner* — Erick R Solis
(74) *Attorney, Agent, or Firm* — Finnegan, Henderson, Farabow, Garrett & Dunner, LLP (57) ABSTRACT A vehicle includes: an internal combustion engine including a fuel injection valve, a spark plug, and an electrically powered motor that rotates a crankshaft; and a controller that causes the internal combustion engine to start in a case where a starting condition is established while the internal combustion engine is stopped. The controller is configured to perform, when the starting condition is established, a first firing-combined starting that injects fuel into the combustion chamber by means of the fuel injection valve and performs, for a first time, a firing that ignites the injected fuel by means of the spark plug and, together therewith, starts driving of the motor, and after the speed of the internal combustion engine exceeds a predetermined determination threshold value that is greater than a resonance band, performs the firing for a second and succeeding times in sequence.

4 Claims, 7 Drawing Sheets (51) Int. Cl.
*F02N 11/04* (2006.01)
*F02N 15/08* (2006.01)

(56) References Cited

U.S. PATENT DOCUMENTS

| | | | | |
|---|---|---|---|---|
| 2002/0116113 A1* | 8/2002 | Kaneko | ............... | F02D 41/065 701/112 |
| 2006/0016412 A1* | 1/2006 | Butcher | ............... | B60K 6/365 123/179.3 |
| 2009/0256513 A1* | 10/2009 | Ando | ................ | B60K 6/445 318/478 |
| 2014/0338642 A1* | 11/2014 | Kamijo | ............... | B60K 6/445 123/491 |
| 2015/0247482 A1* | 9/2015 | Enomoto | ........... | F02N 11/0844 701/113 |

FOREIGN PATENT DOCUMENTS

| | | |
|---|---|---|
| JP | 2009-228538 | 10/2009 |
| JP | 2011-47348 | 3/2011 |
| JP | 2013-160088 | 8/2013 |

* cited by examiner

CONTROL APPARATUS FOR VEHICLE

FIELD

The present disclosure relates to a control apparatus for a vehicle, and more particularly to a control apparatus for a vehicle in which an internal combustion engine is mounted.

BACKGROUND

Technology for smoothly starting an internal combustion engine is already known, as disclosed, for example, in JP 2011-47348. According to this technology, when a request is made to start an internal combustion engine, cranking is performed by a cranking motor. Further, if the speed of the internal combustion engine becomes greater than a resonance band of the vehicle, injection of fuel to the internal combustion engine and ignition are started. Thereby, the occurrence of vibrations when starting the internal combustion engine is suppressed.

SUMMARY

According to the technology disclosed in the aforementioned Patent Literature 1, when starting an internal combustion engine, only a cranking motor is driven until the speed of the internal combustion engine exceeds the resonance band. Therefore, according to the aforementioned Patent Literature 1, although vibrations can be suppressed when starting an internal combustion engine, there is the problem that the amount of power consumption is large.

The present disclosure has been conceived in consideration of the aforementioned problem, and an object of the present disclosure is to provide a control apparatus for a vehicle that, when starting an internal combustion engine from a stopped state, can reduce the amount of power consumption while suppressing the occurrence of vibrations.

To achieve the aforementioned object, a first disclosure is a control apparatus for a vehicle, that is applied to a vehicle in which is mounted an internal combustion engine. The apparatus includes a fuel injection valve that injects fuel directly into a combustion chamber, a spark plug that ignites the fuel injected into the combustion chamber, an electrically powered motor that rotates a crankshaft, and a controller being configured to cause the internal combustion engine to start in a case where a starting condition for starting the internal combustion engine is established while the internal combustion engine is stopped. The controller is configured to perform, in a case where the starting condition is established, a first firing-combined starting that injects fuel into the combustion chamber by means of the fuel injection valve and performs, for a first time, a firing that ignites the injected fuel by means of the spark plug and, together therewith, starts driving of the motor, and after a speed of the internal combustion engine exceeds a predetermined determination threshold value that is greater than a resonance band, performs the firing for a second and succeeding times in sequence.

A second disclosure is, in the first disclosure, such that the controller is configured to stop driving of the motor in a case where the speed of the internal combustion engine exceeds the determination threshold value.

A third disclosure is, in the first disclosure, such that the starting condition includes a first condition that does not include a travel demand with respect to the vehicle, and a second condition that includes the travel demand. The controller is configured to perform the first firing-combined starting in a case where the first condition is established, and in a case where the second condition is established, perform a second firing-combined starting that performs the firing a first time and, together therewith, starts driving of the motor, and from prior to the speed of the internal combustion engine exceeding the determination threshold value, performs the firing a second and succeeding times in sequence.

A fourth disclosure is, in the first disclosure, such that further includes=electric power storage apparatus that supplies electric power to the motor. The controller is configured to prohibit the first firing-combined starting in a case where a charging rate of the electric power storage apparatus is lower than a predetermined threshold value.

According to the first disclosure, in a case where a starting condition is established, a firing is performed for a first time and, together therewith, driving of a motor is started. Further, after the speed of the internal combustion engine exceeds a predetermined determination threshold value that is greater than the resonance band, the firing is performed for a second time and succeeding times in sequence. Thereby, performance of firing can be prevented while the speed of the internal combustion engine belongs to the range of a resonance band, and hence vibrations that are generated by firing can be suppressed. Further, since explosion torque that is generated by the first firing is used as a part of torque for rotating the internal combustion engine, it is possible to reduce the amount of power consumption of the motor when starting the internal combustion engine.

According to the second disclosure, driving of the motor is stopped in a case where the speed of the internal combustion engine exceeds a determination threshold value. Because firing is performed in a case where the speed of the internal combustion engine exceeds the determination threshold value, it is also possible to stop the motor. Therefore, according to the present disclosure, by stopping the motor, it is possible to reduce the amount of power consumption of the motor when starting the internal combustion engine.

According to the third disclosure, in a case where a starting condition that does not include a travel demand with respect to the vehicle is established, because firing is not performed during a period in which the speed of the internal combustion engine belongs to a resonance band, the prevention of vibrations can be prioritized. Further, in a case where a starting condition that includes a travel demand with respect to the vehicle is established, because firing is also performed during a period in which the speed of the internal combustion engine belongs to the resonance band, it is possible to enhance starting responsiveness.

According to the fourth disclosure, the first firing-combined starting is prohibited in a case where the charging rate of an electric power storage apparatus is lower than a predetermined threshold value. Therefore, according to the present disclosure, it is possible to prevent the occurrence of a situation in which the electric power that is supplied to the motor from the electric power storage apparatus is insufficient and starting becomes unstable.

DESCRIPTION OF EMBODIMENTS

An embodiment of the present disclosure is described hereunder with reference to the accompanying drawings. However, it is to be understood that even when the number, quantity, amount, range or other numerical attribute of an element is mentioned in the following description of the embodiment, the present disclosure is not limited to the mentioned numerical attribute unless it is expressly stated or theoretically defined. Further, structures or steps or the like described in conjunction with the following embodiment are not necessarily essential to the present disclosure unless expressly stated or theoretically defined.

First Embodiment

A first embodiment will now be described referring to the accompanying drawings.

[Configuration of First Embodiment]

Figure 1:
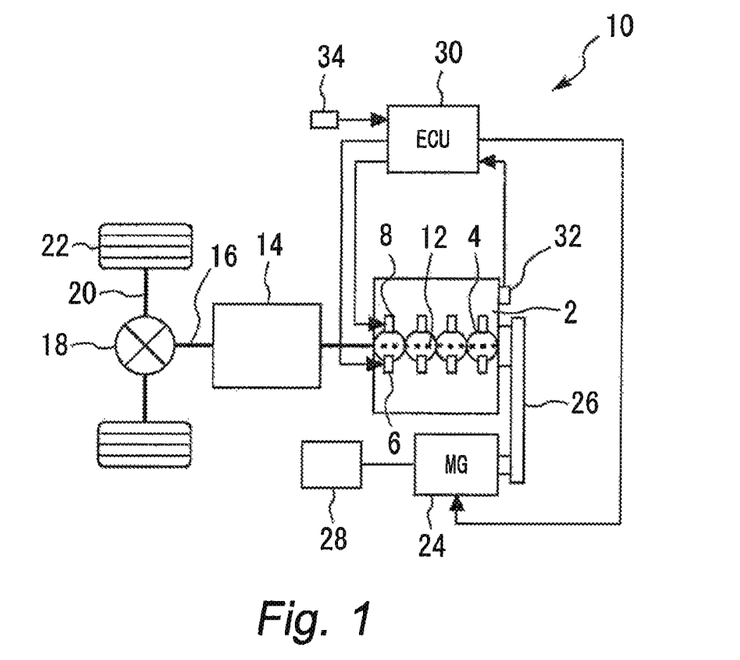
FIG. 1 is a view illustrating the engine system configuration of a vehicle to which a control apparatus of a first embodiment is applied.

FIG. 1 is a view illustrating the engine system configuration of a vehicle to which a control apparatus of the first embodiment is applied. The engine system according to the present embodiment includes an internal combustion engine 2. The internal combustion engine 2 is a spark-ignition gasoline engine (hereunder, referred to simply as "engine"). The engine 2 is mounted in a vehicle 10 as a power source. A plurality of cylinders 4 are arranged in-line in a main body of the engine 2. Each of the cylinders 4 includes a fuel injection valve 6 for injecting fuel directly into a combustion chamber, and a spark plug 8 for performing ignition of the injected fuel.

A crankshaft 12 of the engine 2 is connected to a transmission 14. A propeller shaft 16 is connected to an output shaft of the transmission 14. The propeller shaft 16 is connected to left and right drive shafts 20 through a differential gear 18. Drive wheels 22 of the vehicle 10 are connected to the drive shafts 20.

The engine 2 according to the present embodiment includes a motor generator (hereunder, also referred to as "MG") 24. The MG 24 is connected through a belt 26 to the crankshaft 12 of the engine 2. The MG 24 has a function as a power generator that performs electric power generation using torque of the crankshaft 12 that is transmitted through the belt 26. The MG 24 also has a function as a motor that transmits torque to the crankshaft 12 through the belt 26. An electric power storage apparatus 28 is connected to the MG 24. The electric power storage apparatus 28 stores electric power generated by the MG 24, and also supplies electric power for driving the MG 24. Note that, a power transmission device between the MG 24 and the crankshaft 12 is not limited to the belt 26, and may be power transmission that is achieved by means of a gear, or power transmission that is achieved by direct coupling.

The engine system according to the present embodiment includes an ECU (Electronic Control Unit) 30. The ECU 30 is a controller that performs overall control of the entire engine system, and the controller according to the present disclosure is realized as one function of the ECU 30. The ECU 30 includes at least an input/output interface, a ROM, a RAM and a CPU. The input/output interface is provided in order to take in sensor signals from various sensors, and to also output actuating signals to actuators that the engine 2 includes. The sensors from which the ECU 30 takes in signals are installed at various places in the engine system. A rotational speed sensor 32 that detects the rotational speed of the crankshaft 12 is installed in the engine main body of the engine 2. An accelerator position sensor 34 that outputs a signal in accordance with a depression amount of an accelerator pedal is also installed. Various control programs and maps for controlling the engine 2 are stored in the ROM. The CPU processes the signals of the respective sensors that are taken in, and generates actuating signals for respective actuators in accordance with a predetermined control program. The actuators that are actuated by the ECU 30 include the aforementioned fuel injection valve 6, spark plug 8 and MG 24. Note that the actuators and sensors connected to the ECU 30 also include a large number of actuators and sensors that are not illustrated in the drawing, and a description of such actuators and sensors is omitted from the present description.

[Operations of First Embodiment]

(Idle-Stop Control)

A control program for performing idle-stop control is included in the control programs that the ECU 30 executes. Idle-stop control is control that automatically stops operation of the engine 2 in a case where a stopping condition is established while the engine 2 is operating. A condition such as, for example, an accelerator actuation amount being "0", the vehicle speed being "0" and the brake pedal being depressed may be mentioned as an example of the stopping condition. Further, according to the idle-stop control, the engine 2 is automatically started in a case where a starting condition is established while operation of the engine 2 is being stopped by the idle-stop control. A condition such as, for example, an accelerator actuation amount that is detected by the accelerator position sensor 34 becoming greater than "0", and release of depression of the brake pedal (the brake being turned "off") may be mentioned as an example of the starting condition.

For example, firing starting can be performed when starting from a state in which operation of the engine 2 is stopped by the idle-stop control. Because an intake valve and an exhaust valve are in a closed state at an expansion stroke cylinder, the inside of the cylinder is sealed. Consequently, in a state in which operation of the engine 2 is stopped, if it is attempted to perform fuel injection by the fuel injection valve 6 and ignition by the spark plug 8 with respect to an expansion stroke cylinder, explosion torque can be generated by combustion of an air-fuel mixture.

However, the explosion torque generated in an expansion stroke cylinder may be insufficient for starting the engine 2. To prevent this kind of problem of unstable firing starting, when performing firing starting from a state in which operation of the engine 2 is stopped, for example, firing starting can be performed that combines the use of external assistance using the MG 24 (hereunder, this type of firing starting is referred to as "firing-combined starting").

In the firing-combined starting, the MG 24 is driven during firing starting from a state in which operation of the engine 2 is stopped. According to such control, since part of the torque that is required for starting the engine 2 can be generated in a supplementary manner by the MG 24, failures when starting the engine 2 can be prevented and the starting responsiveness can also be enhanced.

However, the occurrence of vibrations during starting is a problem in the case of the firing-combined starting. That is, in a low-speed region of the engine 2, a speed band referred to as a "resonance band" exists in which vibrations of the engine 2 cause resonance in the engine system. Although the resonance band differs depending on the vehicle, for example, the resonance band exists in a low-speed region in which the engine speed is around 100 to 350 rpm. If an explosion is performed by firing starting while the engine speed belongs to the resonance band, a loss in comfort will occur due to the occurrence of vibrations.

Figure 2:
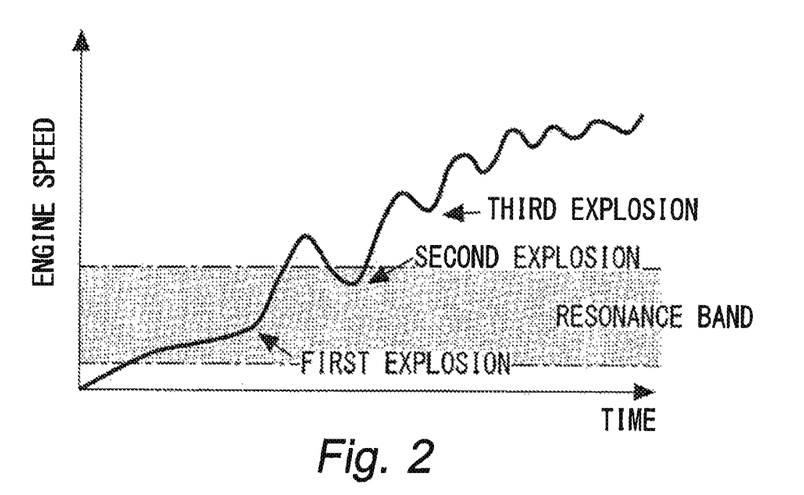
FIG. 2 is a view illustrating changes over time in the engine speed during starter starting.
Figure 3:
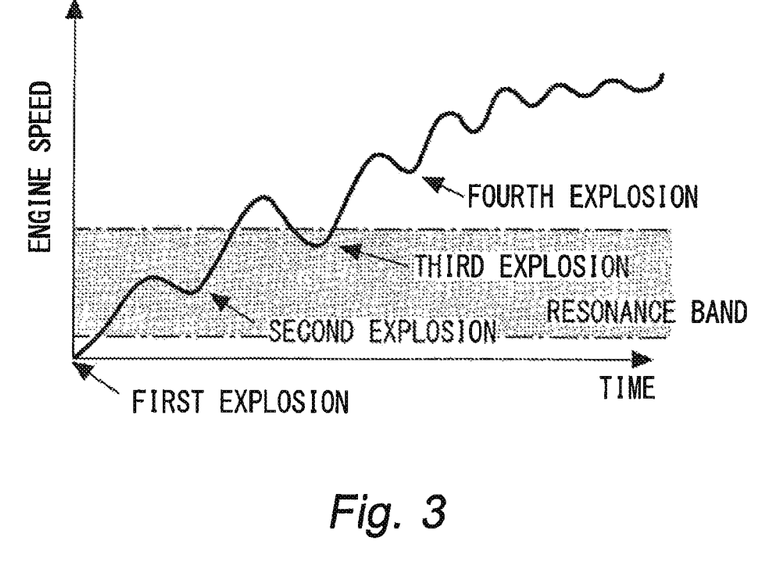
FIG. 3 is a view illustrating changes over time in the engine speed during firing-combined starting.

In particular, in the case of firing-combined starting, there is a tendency for the number of explosions until passing through the resonance band to increase in comparison to normal starting that uses a starter (hereunder, referred to as "starter starting"). FIG. 2 is a view that illustrates changes over time in the engine speed in the case of starter starting. FIG. 3 is a view that illustrates changes over time in the engine speed in the case of firing-combined starting. As illustrated in FIG. 2, in the case of starter starting, an explosion caused by an initial firing (hereunder, referred to as "initial explosion") is performed after the engine speed has been increased by a starter. Therefore, in the example illustrated in FIG. 2, two explosions are performed before passing through the resonance band. In contrast, in the firing-combined starting illustrated in FIG. 3, an initial explosion is performed while the engine 2 is stopped. Therefore, in the example illustrated in FIG. 3, three explosions are performed before passing through the resonance band. Thus, although the firing-combined starting is effective with regard to improving the starting responsiveness, there is the problem of an increase in vibrations that is caused by an increase in the number of explosions until the resonance band is passed through.

The starting conditions that arise in a state in which operation of the engine 2 is stopped by the idle-stop control are a first condition that is established by a demand of the system, and a second condition that is established by a demand of the driver. The first condition is a starting condition that does not include a travel demand with respect to the vehicle 10. For example, a condition for actuating auxiliary equipment by means of the engine 2, such as a fact that the charging rate of the electric power storage apparatus 28 has fallen below a lower limit, or a fact that a negative pressure of a brake system that the vehicle 10 is equipped with has fallen below a lower limit may be mentioned as examples of the first condition. The second condition is a condition that includes a travel demand with respect to the vehicle 10 that is based on the will of the driver. For example, a fact that an accelerator actuation amount has become greater than "0", a fact that depression of a brake pedal has been released, or a fact that a clutch pedal has been depressed may be mentioned as examples of the second condition.

Because the starting that is performed when the second condition is established is starting that is based on the will of the driver and that is accompanied by a travel demand with respect to the vehicle 10, importance is attached to enhancing the starting responsiveness rather than decreasing vibrations. On the other hand, because the starting that is performed when the first condition is established is not starting that is based on the will of the driver and is not accompanied by a travel demand with respect to the vehicle 10, importance is attached to decreasing vibrations rather than enhancing the starting responsiveness.

Therefore, the system of the first embodiment is configured to perform different firing-combined starting in accordance with whether or not a starting condition includes a travel demand with respect to the vehicle. Specifically, in a state in which operation of the engine 2 is stopped by the idle-stop control, firing-combined starting that is based on a system demand (hereunder, referred to as "first firing-combined starting") is performed in a case where the first condition is established as the starting condition, and firing-combined starting that is based on a driver demand (hereunder, referred to as "second firing-combined starting") is performed in a case where the second condition is established as the starting condition. Hereunder, these two kinds of firing-combined starting are described with reference to the drawings.

Figure 4:
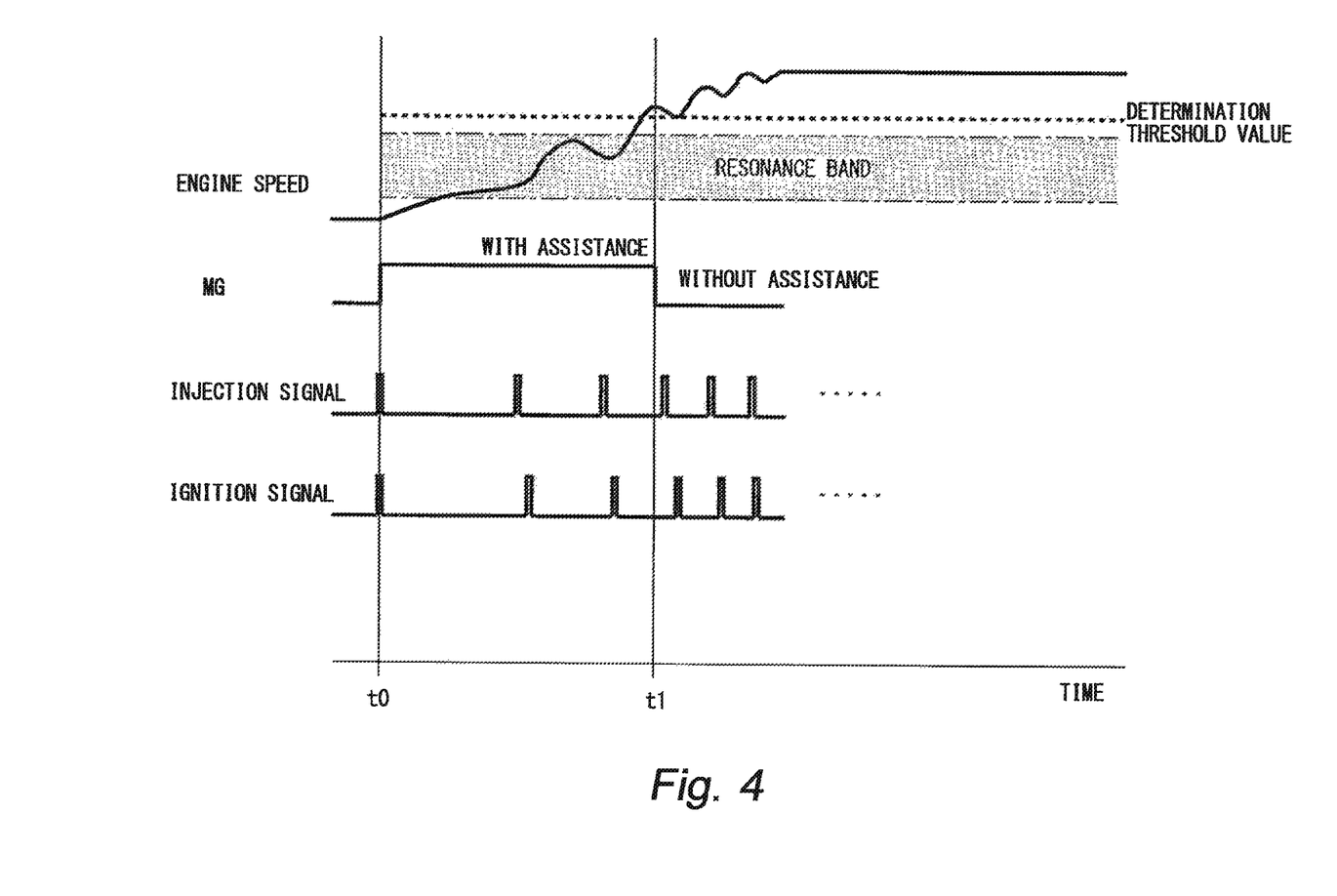
FIG. 4 is a time chart illustrating changes in various state quantities during second firing-combined starting that is based on a driver demand.
Figure 5:
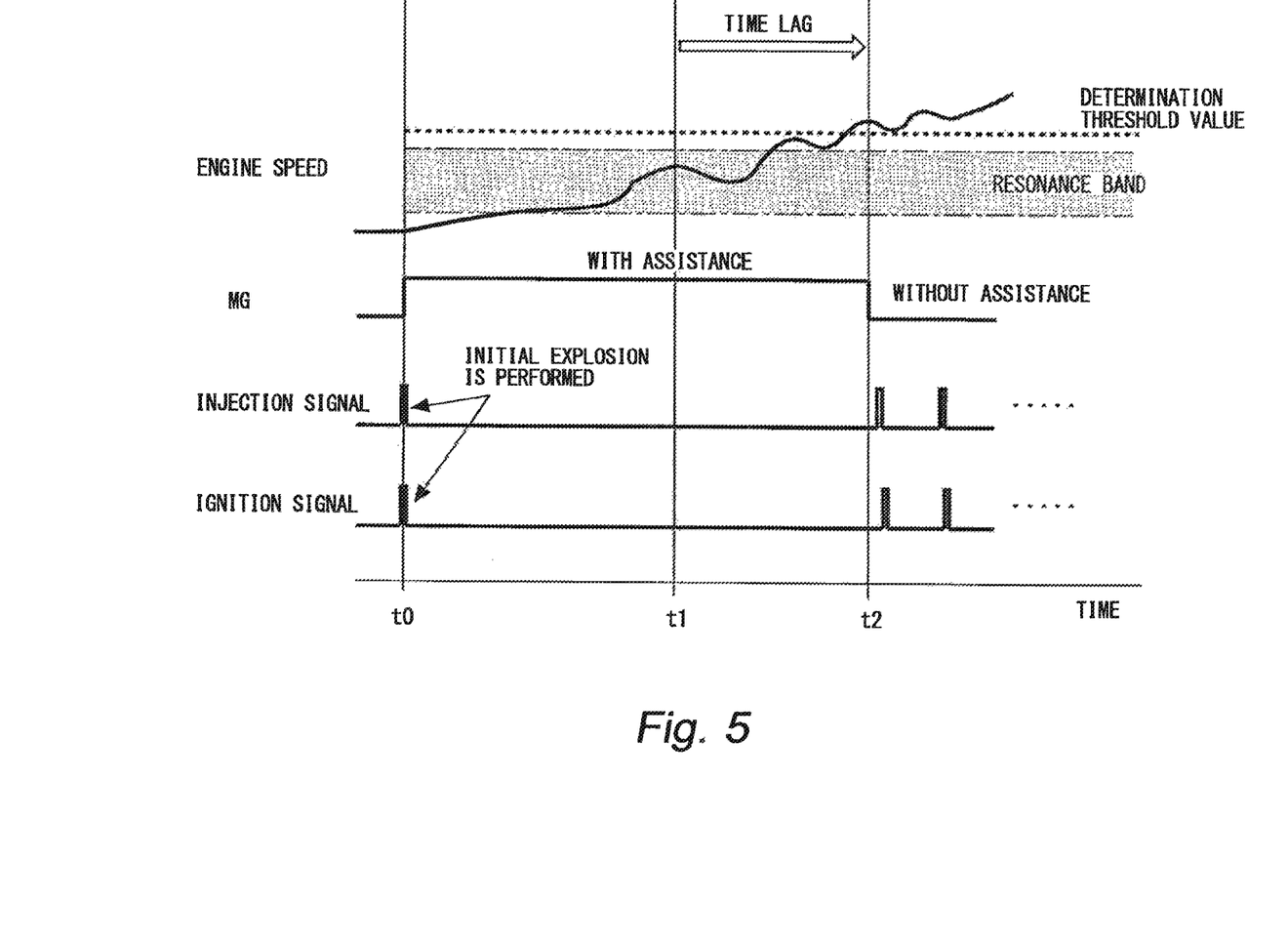
FIG. 5 is a time chart illustrating changes in various state quantities during first firing-combined starting that is based on a system demand.

FIG. 4 is a time chart showing changes in various state quantities during the second firing-combined starting that is based on a driver demand. Further, FIG. 5 is a time chart showing changes in various state quantities during the first firing-combined starting that is based on a system demand. As illustrated in FIG. 4, in the second firing-combined starting that is based on a driver demand, at a time t0 at which the second condition is established, driving of the MG 24 is started and, together therewith, fuel injection by the fuel injection valve 6 and ignition by means of the spark plug 8 are performed with respect to expansion stroke cylinders of the engine 2 that are stopped. Upon an initial explosion that is caused by a first firing and driving of the MG 24 being performed at the time t0, the crankshaft 12 is rotated by explosion torque that the engine 2 generates and driving torque generated by the MG 24, and the engine speed thereby increases. In the second firing-combined starting, from prior to a time t1 at which the engine speed exceeds a determination threshold value, a second and succeeding firings are performed in sequence with respect to the expansion stroke cylinders. That is, in the second firing-combined starting, after the first firing, the next and succeeding firings with respect to the expansion stroke cylinders are performed in sequence. Thereby, during the period from the time t0 to the time t1, the crankshaft 12 is rotated by explosion torque generated by firing and by driving torque generated by the MG 24. Subsequently, driving by the MG 24 is stopped at the time t1 at which the engine speed exceeds the determination threshold value. Thereby, from the time t1 onward, the crankshaft 12 is rotated by means of only explosion torque that is generated by firing.

Figure 6:
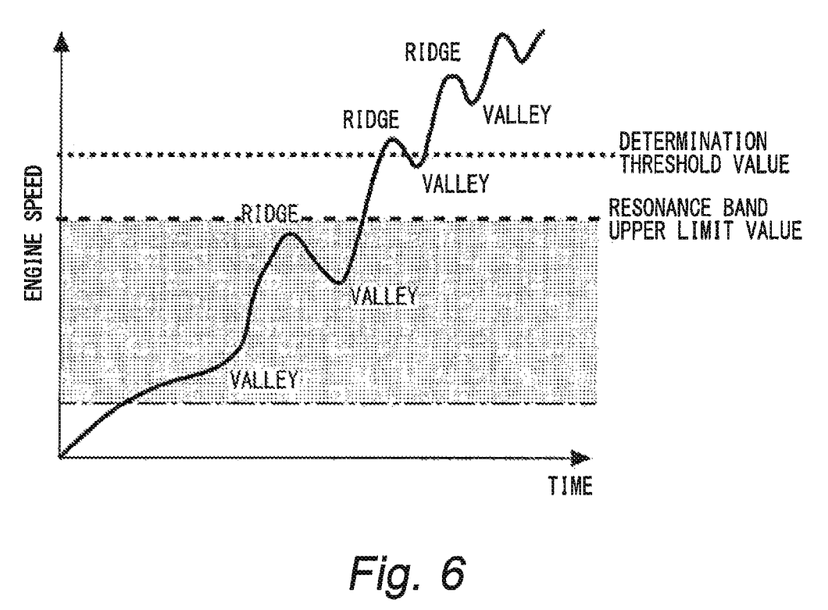
FIG. 6 is a view for describing setting of a determination threshold value.

FIG. 6 is a view for describing setting of the determination threshold value. As illustrated in FIG. 6, the determination threshold value is set to an engine speed that is greater than an upper limit value of the resonance band. Note that, as illustrated in FIG. 6, the engine speed rises while receiving the influence of torque fluctuations caused by the explosion torque and forming ridges and valleys in the upward and downward directions. Therefore, it is desirable that the determination threshold value is set to a value such that a valley portion after the engine speed exceeds the determination threshold value is not less than the upper limit value of the resonance band.

Thus, according to the second firing-combined starting that is based on a driver demand, during a period until the engine speed exceeds the determination threshold value, the MG 24 is driven and fuel injection and ignition are continuously performed. Thereby, it is possible to improve starting responsiveness when starting the engine 2 from an idle-stop state.

On the other hand, as illustrated in FIG. 5, in the first firing-combined starting that is based on a system demand, at a time t0 at which the first condition is established, driving of the MG 24 is started and, together therewith, fuel injection by the fuel injection valve 6 and ignition by means of the spark plug 8 are performed with respect to expansion stroke cylinders of the engine 2 that are stopped. Upon an initial explosion that is caused by a first firing and driving of the MG 24 being performed at the time t0, the crankshaft 12 is rotated by means of explosion torque that the engine 2 generates and driving torque generated by the MG 24, and the engine speed thereby increases. According to the first firing-combined starting, the firing thereafter is temporarily stopped, and the engine speed is raised by means of only the driving torque of the MG 24. Subsequently, at a time t2(>t1) at which the engine speed exceeds the determination threshold value, driving of the MG 24 is stopped and a second and succeeding firings are performed in sequence with respect to the expansion stroke cylinders. Thereby, from the time t2 onwards, the crankshaft 12 is rotated by means of only explosion torque generated by firing.

Thus, according to the first firing-combined starting that is based on a system demand, during a period until the engine speed exceeds the determination threshold value, the MG 24 is driven and, from the initial explosion onward, fuel injection and ignition are restricted until the engine speed exceeds the determination threshold value. Thereby, vibrations that are caused by explosions in the engine 2 being performed while the engine speed is in the resonance band can be prevented. Further, according to the first firing-combined starting, since explosion torque generated by an initial explosion in the engine 2 is used as a part of the torque when starting the engine 2, it is possible to reduce power consumption by the MG 24. Further, since the driving torque that is required from the MG 24 also decreases, it is possible to use a small MG that is of a size that is in accordance with the required driving torque. Thereby, it is possible to achieve advantageous effects such as improving the space efficiency of the vehicle 10 and improving fuel consumption by reducing the weight of the vehicle 10.

[Specific Processing in First Embodiment]

Figure 7:
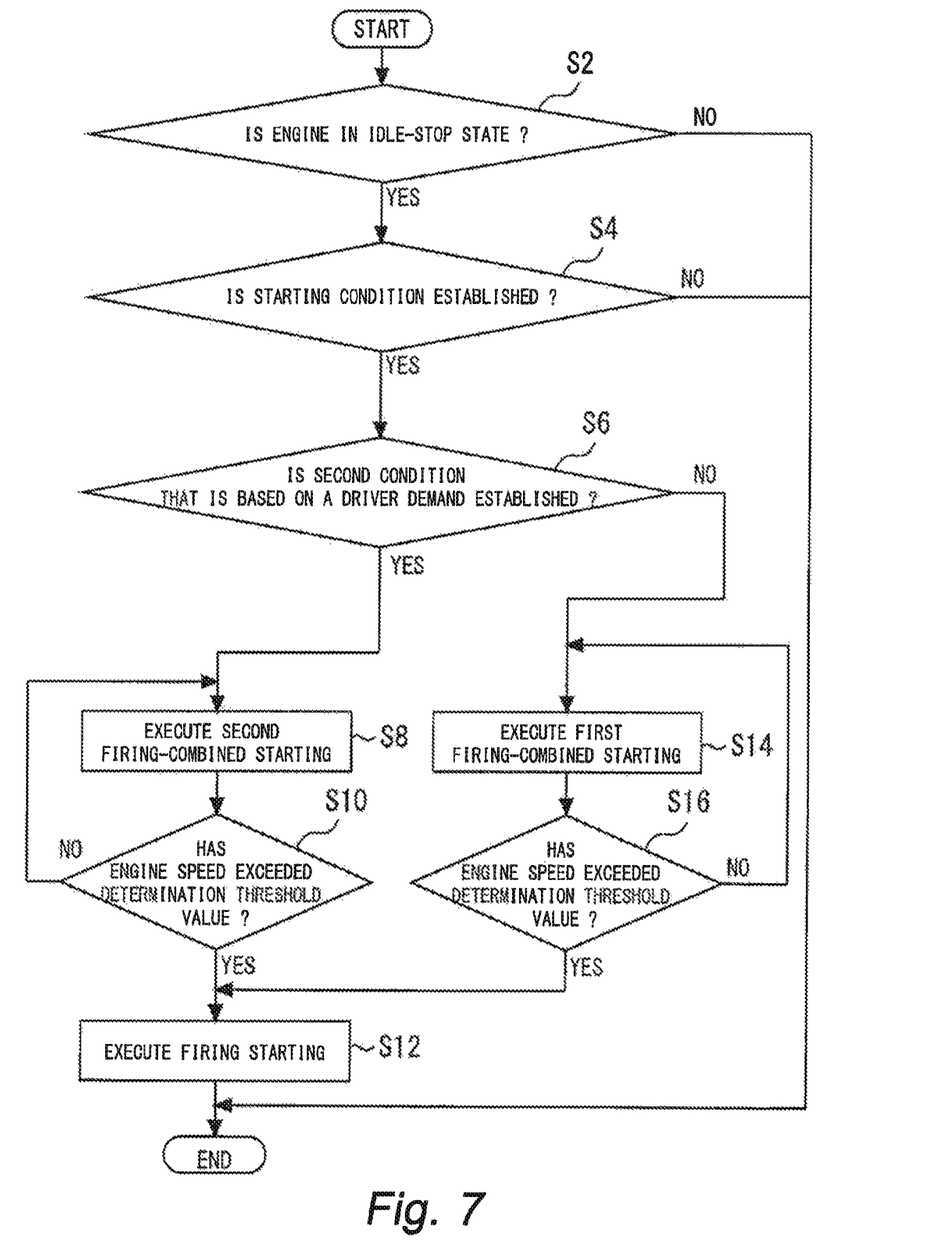
FIG. 7 is a flowchart illustrating a control routine that is executed by an ECU 30 in the first embodiment.

Next, specific processing for the firing-combined starting that is executed in the system of the present embodiment will be described referring to FIG. 7. FIG. 7 is a flowchart illustrating a control routine that is executed by the ECU 30 in the present embodiment. Note that, the routine illustrated in FIG. 7 is repeatedly executed in a period in which the ignition of the engine 2 is turned on.

In the control routine illustrated in FIG. 7, first, it is determined whether or not the engine 2 is in an idle-stop state (step S2). In this case, it is determined whether or not the state is one in which operation of the engine 2 is stopped by the idle-stop control. If it is determined as a result that the engine 2 is not in an idle-stop state, the present routine is ended at once. On the other hand, if it is determined in the aforementioned step S2 that the engine 2 is in an idle-stop state, the processing transitions to the next step to determine whether or not a starting condition is established (step S4). If it is determined as a result that a starting condition is not established, the present routine is ended at once.

If the result determined in the aforementioned step S4 is that a starting condition is established, the processing transitions to the next step to determine whether or not the condition that is established in the aforementioned step S4 is the second condition that is established based on a demand of the driver (step S6). If it is determined as a result that the starting condition is the second condition, the processing transitions to the next step to execute the second firing-combined starting that is based on a driver demand (step S8). In this case, specifically, driving of the MG 24 is started and, together therewith, fuel injection and ignition are performed in sequence from the initial expansion stroke cylinder.

Upon the processing in the aforementioned step S8 being executed, next it is determined whether or not an engine speed detected by the rotational speed sensor 32 exceeds the determination threshold value (step S10). If the result of the determination in step S10 is that the engine speed does not exceed the determination threshold value, the processing returns again to step S8. On the other hand, if the result of the determination in step S10 is that the engine speed exceeds the determination threshold value, the processing transitions to the next step to switch to firing starting (step S12). In this case, specifically, driving of the MG 24 is stopped and, together therewith, fuel injection and ignition are performed in sequence with respect to the expansion stroke cylinders.

In the routine illustrated in FIG. 7, if the result of the determination in the aforementioned step S6 is that the established condition is not the second condition that is established based on a demand of the driver, it can be determined that the condition established in step S4 is the first condition that is established based on a system demand. In this case, the processing transitions to step S14 to execute the first firing-combined starting that is based on a system demand (step S14). In this case, specifically, driving of the MG 24 is started and, together therewith, only a first firing that is performed with respect to the initial expansion stroke cylinder is performed.

Upon the processing in the aforementioned step S14 being executed, next it is determined whether or not the engine speed exceeds the determination threshold value (step S16). If the result determined in step S16 is that the engine speed does not exceed the determination threshold value, it is determined that there is a possibility that the engine speed belongs to the resonance band or belongs once again to the resonance band. In this case, the processing returns to step S14 again, and driving of the MG 24 is continued. On the other hand, if the result determined in step S16 is that the engine speed exceeds the determination threshold value, it is determined that the engine speed has completely exceeded the resonance band. In this case, the processing transitions to step S12. In step S12, the starting is switched to firing starting.

Thus, according to the engine system of the first embodiment that is described above, in a case where a starting condition (first condition) that does not include a travel demand with respect to the vehicle 10 is established, the MG 24 is driven and, together therewith, firing for an initial explosion is performed. Subsequently, firing is restricted after the initial explosion, and only the MG 24 is driven until the engine speed exceeds the determination threshold value. Thereby, the occurrence of vibrations that are generated as a result of firing being performed in the resonance band can be prevented. Further, since a part of the driving torque for rotating the engine 2 is generated in a supplementary manner by explosion torque produced by the initial explosion, it is possible to reduce the amount of electric power that is consumed by the MG 24.

The foregoing is a description of the system of the first embodiment, and the system of the first embodiment may be further modified as described hereunder.

Even in a case where the starting condition that is established while the engine 2 is stopped is the second condition, the firing that is performed until the engine speed exceeds the determination threshold value may be restricted to only the firing for the initial explosion. This control may be realized by, for example, in the routine illustrated in the above described FIG. 7, configuring control logic so as to transition to step S14 in a case where the result of the determination in step S4 is affirmative. Thereby, irrespective of whether the established starting condition is the second condition or the first condition, since firing is avoided in the resonance band, priority can be given to preventing the generation of vibrations.

The timing at which driving of the MG 24 is stopped in the firing-combined starting is not limited to a time point at which the engine speed exceeds the determination threshold value. That is, it is sufficient for the timing at which driving of the MG 24 is stopped to be after the engine speed exceeds the determination threshold value, and for example a configuration may be adopted in which, after the determination threshold value is exceeded, driving is further continued and the starting responsiveness is further improved.

A configuration may be adopted so as to prohibit execution of the first firing-combined starting in a case where the charging rate (State Of Charge; SOC) of the electric power storage apparatus 28 is lower than a predetermined charging rate, even if the established starting condition is the first condition. For example, a value that is determined in advance by experimentation or the like as an electric power amount that is required for first firing-combined starting based on a system demand may be used as the predetermined charging rate. According to this control, the occurrence of a situation in which the electric power of the electric power storage apparatus 28 is insufficient and starting becomes unstable can be prevented. Further, a configuration may also be adopted so as to perform the second firing-combined starting based on a driver demand in a case where execution of the first firing-combined starting is prohibited, even if the established starting condition is the first condition. Thereby, it is possible to perform firing-combined starting even in a case where the charging rate of the electric power storage apparatus 28 is lower than the predetermined charging rate.

Figure 8:
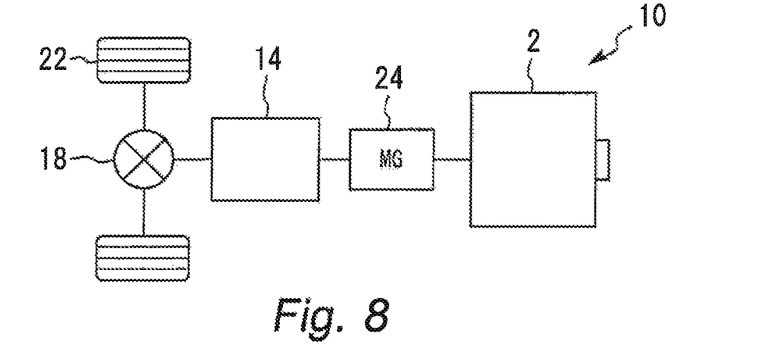
FIG. 8 is a view illustrating a modification example of the engine system configuration of a vehicle to which the control apparatus, of the first embodiment is applied.

The engine system configuration of the first embodiment may be modified as described in the following. FIG. 8 is a view that illustrates a modification example of the engine system configuration of a vehicle to which the control apparatus of the first embodiment is applied. As illustrated in FIG. 8, the MG 24 may be connected so as to be interposed between the crankshaft 12 and the transmission 14 of the engine 2.

Figure 9:
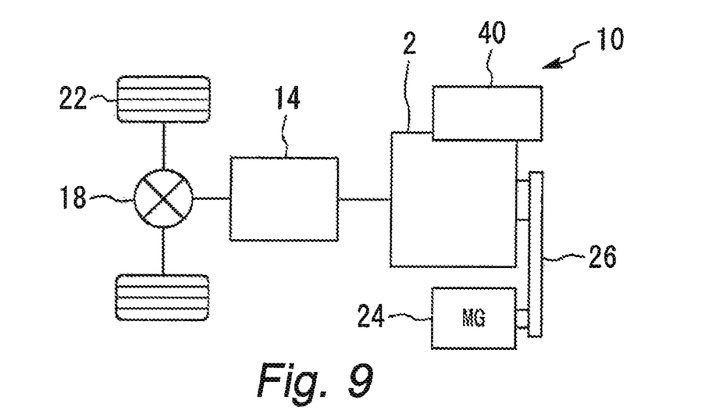
FIG. 9 is a view illustrating another modification example of the engine system configuration of a vehicle to which the control apparatus of the first embodiment is applied.
Figure 10:
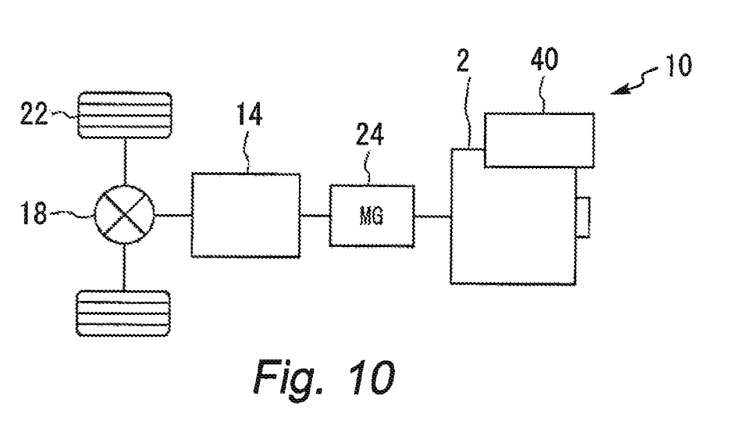
FIG. 10 is a view illustrating a further modification example of the engine system configuration of a vehicle to which the control apparatus of the first embodiment is applied.

Further, FIG. 9 and FIG. 10 are views that illustrate other modification examples of the engine system configuration of a vehicle to which the control apparatus of the first embodiment is applied. In the engine system illustrated in FIG. 9, the engine system illustrated in FIG. 1 is further provided with a starter 40. The starter 40 is an electrically powered motor that is connected to the crankshaft 12 through a gear, and has a function of rotating the crankshaft 12 when starting the engine 2. Further in the engine system illustrated in FIG. 10, the engine system illustrated in FIG. 8 is further provided with the starter 40. In the engine systems illustrated in FIG. 9 and FIG. 10, the starter 40 can also be driven together with the MG 24 during the firing-combined starting. Thereby, since it is possible to further reduce the driving torque that is required of the MG 24, it is possible to further reduce the size of the MG 24. Further, if the starter 40 that is mounted is capable of exerting driving torque that is comparable to the driving torque of the MG 24, for example, a configuration may be adopted which performs firing-combined starting by means of only the starter 40 and without using the MG 24.

The ECU 30 (controller) that the engine system 1 of the first embodiment is equipped with may be configured as follows. The respective functions of the ECU 30 may be realized by a processing circuit. The processing circuit of the ECU 30 may include at least one processor and at least one memory. In a case where the processing circuit includes at least one processor and at least one memory, the respective functions of the ECU 30 may be realized by software, firmware or a combination of software and firmware. At least one of the software and the firmware may be described as a program. At least one of the software and the firmware may be stored in at least one memory. At least one processor may realize the respective functions of the ECU 30 by reading out a program stored in at least one memory and executing the program. At least one memory may include a non-volatile or volatile semiconductor memory or the like.

The processing circuit of the ECU 30 may include at least one piece of dedicated hardware. In a case where the processing circuit includes at least one piece of dedicated hardware, the processing circuit may be, for example, a single circuit, a composite circuit, a programmed processor, a parallel-programmed processor, an ASIC (Application Specific Integrated Circuit), a FPGA (Field-Programmable Gate Array) or any combination thereof. The functions of each part of the ECU 30 may be realized by respective processing circuits. Further, the functions of each part of the ECU 30 may be realized by collectively by a processing circuit. With regard to the respective functions of the ECU 30, one part thereof may be realized with dedicated hardware, and another part may be realized with software or firmware. The processing circuit may realize the respective functions of the ECU 30 by means of hardware, software, firmware or any combination thereof.

What is claimed is:

1. A control apparatus for a vehicle, that is applied to a vehicle in which is mounted an internal combustion engine, the apparatus comprising:
   a fuel injection valve that injects fuel directly into a combustion chamber;
   a spark plug that ignites the fuel injected into the combustion chamber;
   an electrically powered motor that rotates a crankshaft; and
   a controller being configured to cause the internal combustion engine to start in a case where a starting condition for starting the internal combustion engine is established while the internal combustion engine is stopped,
   wherein the controller is configured to perform, in a case where the starting condition is established, a first firing-combined starting that injects fuel into the combustion chamber by means of the fuel injection valve and performs, for a first time, a firing that ignites the injected fuel by means of the spark plug and, together therewith, starts driving of the motor, and after a speed of the internal combustion engine exceeds a predetermined determination threshold value that is greater than a resonance band, performs the firing for a second and succeeding times in sequence.

2. The control apparatus for a vehicle according to claim 1,
wherein the controller is configured to stop driving of the motor in a case where the speed of the internal combustion engine exceeds the determination threshold value.

3. The Control apparatus for a vehicle according to claim 1, wherein:
the starting condition includes a first condition that does not include a travel demand with respect to the vehicle, and a second condition that includes the travel demand, and
the controller is configured to;
perform the first firing-combined starting in a case where the first condition is established, and
in a case where the second condition is established, perform a second firing-combined starting that performs the firing a first time and, together therewith, starts driving of the motor, and from prior to the speed of the internal combustion engine exceeding the determination threshold value, performs the firing a second and succeeding times in sequence.

4. The control apparatus for a vehicle according to claim 1, further comprising
an electric power storage apparatus that supplies electric power to the motor,
wherein the controller is configured to prohibit the first firing-combined starting in a case where a charging rate of the electric power storage apparatus is lower than a predetermined threshold value.

* * * * *